(12) United States Patent
Iwatsubo et al.

(10) Patent No.: US 9,924,773 B2
(45) Date of Patent: Mar. 27, 2018

(54) VALVE, BOWL FOR RECEIVING AND/OR MIXING FLUIDS, USE OF A BOWL AND METHOD FOR RECEIVING AND/OR MIXING FLUIDS

(71) Applicant: KAO GERMANY GMBH, Darmstadt (DE)

(72) Inventors: Mitsugo Iwatsubo, Tokyo (JP); Peter Lamboy, Weiterstadt (DE)

(73) Assignee: KAO GERMANY GMBH, Darmstadt (DE)

( * ) Notice: Subject to any disclaimer, the term of this patent is extended or adjusted under 35 U.S.C. 154(b) by 226 days.

(21) Appl. No.: 14/419,611

(22) PCT Filed: Aug. 29, 2013

(86) PCT No.: PCT/EP2013/067927
§ 371 (c)(1),
(2) Date: Feb. 4, 2015

(87) PCT Pub. No.: WO2014/033226
PCT Pub. Date: Mar. 6, 2014

(65) Prior Publication Data
US 2015/0208781 A1    Jul. 30, 2015

(30) Foreign Application Priority Data
Aug. 31, 2012    (EP) .................................... 12182679

(51) Int. Cl.
*A45D 19/00*    (2006.01)
*A45D 19/06*    (2006.01)
(Continued)

(52) U.S. Cl.
CPC ............. *A45D 19/06* (2013.01); *A45D 19/00* (2013.01); *B01F 3/04007* (2013.01);
(Continued)

(58) Field of Classification Search
CPC .... A61M 2039/2433; A61M 2039/246; A61M 39/24; F16K 15/144; F16K 15/145;
(Continued)

(56) References Cited

U.S. PATENT DOCUMENTS 3,203,454 A * 8/1965 Micallef ................ B65D 83/28
141/113
3,559,850 A * 2/1971 Barkin ................... B65D 83/28
219/214

(Continued)

FOREIGN PATENT DOCUMENTS

| EP | 0 081 124 A1 | 6/1983 |
| EP | 2 340 739 A1 | 7/2011 |
| FR | 2429 038 A1 | 1/1980 |
| WO | 99/64313 A1 | 12/1999 |

OTHER PUBLICATIONS

International Search Report dated Sep. 25, 2013, Oct. 2, 2013.

*Primary Examiner* — Tony G Soohoo
(74) *Attorney, Agent, or Firm* — Norris McLaughlin & Marcus PA

(57) ABSTRACT

A valve for injecting a fluid into a bowl has a vent with an inlet and a flexible diaphragm for covering the discharge opening of the vent. The diaphragm is connected to a vessel body of a bowl, and the vent is connected to a stand of a bowl. The diaphragm has a closing area for closing the discharge opening and a connecting area for connecting the diaphragm with the vessel body spaced to the vent. At least one window is provided between the closing area and the connecting area.

15 Claims, 2 Drawing Sheets

Figure 1:
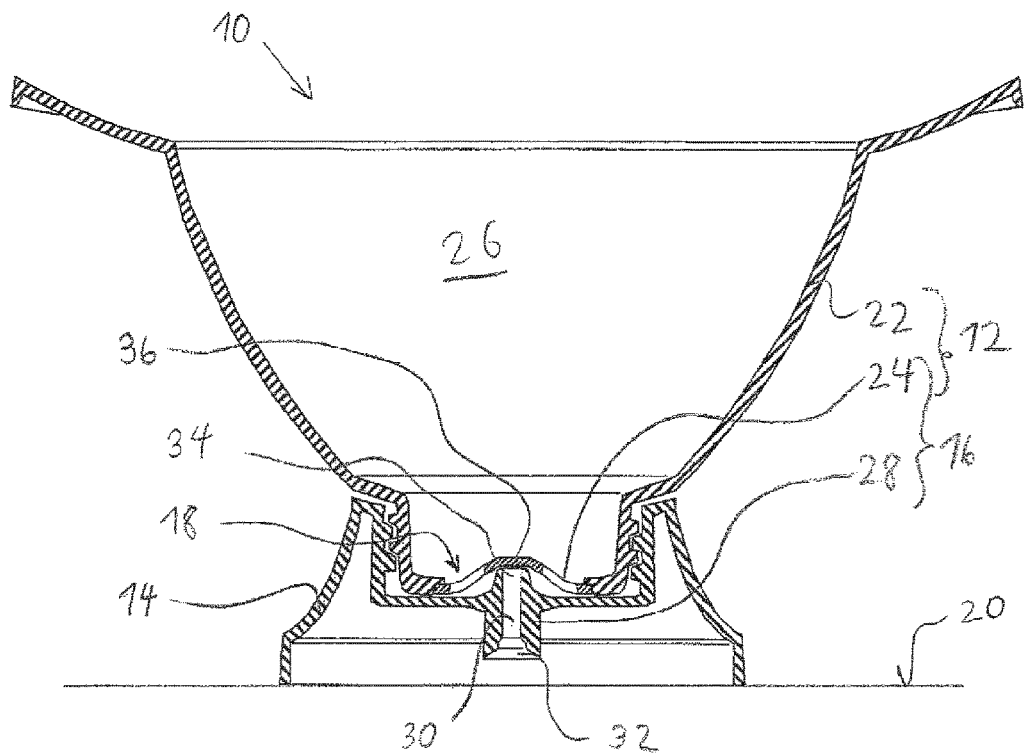

(51) Int. Cl.
*B01F 3/04* (2006.01)
*B01F 15/00* (2006.01)
*F16K 15/14* (2006.01)
*B01F 15/02* (2006.01)

(52) U.S. Cl.
CPC .. *B01F 15/00025* (2013.01); *B01F 15/00032* (2013.01); *B01F 15/00045* (2013.01); *B01F 15/00772* (2013.01); *B01F 15/00831* (2013.01); *B01F 15/026* (2013.01); *F16K 15/144* (2013.01); *F16K 15/145* (2013.01); *A45D 2019/0066* (2013.01); *A45D 2200/058* (2013.01); *B01F 2215/005* (2013.01); *Y10T 137/7895* (2015.04)

(58) Field of Classification Search
CPC ......... Y10T 137/7839; Y10T 137/7879; Y10T 137/7895; A45D 19/06; A45D 19/00; A45D 2200/058; A45D 2019/0066; B01F 15/026; B01F 3/04007; B01F 15/00025; B01F 15/00772; B01F 15/00831; B01F 15/00032; B01F 2215/005
USPC .......................................................... 137/843
See application file for complete search history.

(56) References Cited

U.S. PATENT DOCUMENTS

| | | | | |
|---|---|---|---|---|
| 3,744,678 | A * | 7/1973 | Beres | B65D 83/30 222/205 |
| 4,294,293 | A * | 10/1981 | Lorenz | A45D 19/00 141/100 |
| 4,473,097 | A * | 9/1984 | Knickerbocker | G01F 19/00 141/113 |
| 4,601,413 | A | 7/1986 | Krawagna | |
| 4,712,593 | A * | 12/1987 | Zulauf | B67D 7/0227 141/113 |
| 4,958,661 | A * | 9/1990 | Holtermann | F16K 15/141 137/843 |
| 4,966,199 | A * | 10/1990 | Ruschke | F16K 15/141 137/843 |
| 8,291,936 | B2 * | 10/2012 | Carmody | A61M 39/24 137/512.1 |
| 9,089,682 | B2 * | 7/2015 | Yeh | A61M 39/10 |
| 2004/0250864 | A1* | 12/2004 | Zelson | F16K 15/144 137/859 |
| 2007/0163664 | A1* | 7/2007 | Mijers | F16K 15/144 137/859 |
| 2011/0108147 | A1* | 5/2011 | Carmody | A61M 39/24 137/843 |
| 2011/0155629 | A1 | 6/2011 | Debauge et al. | |

* cited by examiner

VALVE, BOWL FOR RECEIVING AND/OR MIXING FLUIDS, USE OF A BOWL AND METHOD FOR RECEIVING AND/OR MIXING FLUIDS

This application is a 371 application of PCT/EP2013/067927 filed Aug. 29, 2013, which claims foreign priority benefit under 35 U.S.C. § 119 of European Application Nos. 12182679.6 filed Aug. 31, 2012 the disclosures of which are incorporated herein by reference.

The invention relates to a valve particularly for injecting a fluid into a bowl, a bowl for receiving and/or mixing fluids, an use of a bowl and a method for receiving and/or mixing fluids by means of which particularly a hair tinting means can be easily injected into a bowl and an easy cleaning after use is provided.

A known bowl comprises a vessel for receiving and mixing fluids. The vessel is fixed to a stand by a non-detachable snap-on connection at a circumferential region. The stand is placed below the vessel for placing the vessel onto a ground. The vessel comprises an unidirectional valve for injecting a fluid from below. After using the bowl for mixing fluids the bowl has to be cleaned. However, there is a permanent need facilitating the cleaning of such kind of a bowl.

It is an object of the invention providing measures enabling a facilitated cleaning of a bowl adapted for receiving and/or mixing fluids.

The solution of this object is provided according to the invention by a valve, a bowl, an use of said bowl, and a method according to the features as described herein.

An aspect of the invention is directed to a valve, particularly for injecting a fluid into a bowl, comprising a vent for injecting a fluid, wherein the vent comprises an inlet connected to a discharge opening via a discharge channel, and a flexible diaphragm for covering the discharge opening of the vent, wherein the diaphragm is separated from the vent, wherein the diaphragm is adapted to be connected to a first part, particularly a vessel body of a bowl, and the vent is adapted to be connected to a different second part, particularly a stand of a bowl, wherein the diaphragm comprises a closing area for closing the discharge opening and a connecting area for connecting the diaphragm with the first part spaced to the vent, wherein at least one window is provided between the closing area and the connecting area.

The vent and the diaphragm may constitute an unidirectional valve. Since the vent and the diaphragm are not fixed to the same part but to different parts, the diaphragm may be disassembled as a whole from the vent for enabling an easy cleaning of the valve. Cavities, sharp edges or undercuts may be prevented so that areas which are difficult to clean may be omitted. The cleaning of a bowl adapted for receiving and/or mixing fluids comprising such kind of a valve may be facilitated.

The diaphragm may extend quite far in radial direction so that it is not necessary providing a connection of the diaphragm with the first part via the connecting area close to the vent. The designated connection of the diaphragm with the first part can be designed with a stronger focus on a facilitated cleaning, wherein a design rule for providing the unidirectional valve at a small space can be omitted or lesser weighted without affecting the functionality of the valve or a device comprising such kind of a valve. Particularly the connecting area is radially spaced to the vent, wherein the closing area is connected to the connecting area particularly via bridges. Due to the spaced arrangement of the connecting area to the vent the connection of the diaphragm and the vent with different parts is facilitated. Particularly a simple geometry for the first part and the second part can be chosen so that cavities, sharp edges or undercuts may be prevented. Due to the comparatively large radial extension of the diaphragm a sufficient flexibility of the diaphragm for closing and/or opening the discharge opening may be easily provided The diaphragm is particularly made from an elastomeric material, particularly TPE. Particularly the diaphragm contacts the vent such that the diaphragm lay on the material of the vent forming the discharge opening. The diaphragm may contact the vent along a circumferential line and/or at least a main part of a tip area of the vent pointing away from the inlet particularly to a use volume of a bowl. When no pressure is applied the diaphragm may close the vent. When a sufficient pressure is present in the valve, particularly when the content of an aerosol can and/or of a pump dispenser is injected into the vent, the diaphragm may open the vent, for instance by being lifted from the vent. Particularly the inlet may be designed for being put onto the outlet stem of an aerosol can and/or of a pump dispenser. The diaphragm particularly comprises a flat and/or besides the windows mainly even front face pointing towards the use volume of the bowl. Particularly no part of the diaphragm protrudes from the diaphragm towards the use volume so that the use volume is not reduced by a protruding part of the diaphragm. When the diaphragm is bend back to its original shape the whole front face is preferably arranged in one plane.

Directions and/or relative arrangements like "up", "down", "high", "low", "below", "above", "vertical", "horizontal" and the like are understood as directions and/or relative arrangements with respect to gravity direction in a situation, when the inlet of the valve or a bowl comprising the valve is placed onto a horizontal ground. Particularly the discharge channel of the valve is aligned mainly in vertical direction in the intended use position.

Particularly preferred the connecting area of the diaphragm is arranged at least partially on a level below the closing area in the designated use position for pressing the closing area onto the discharge opening of the vent. The diaphragm may be elastically deformed such in the designated use position that the vent of the stand may press a part of the diaphragm upwards so that the closing area of the diaphragm is positioned higher than the connecting area. The bended diaphragm may provide a spring force which provides at least a part of a closing force for closing the discharge opening of the vent by means of the diaphragm. A minimum closing force of the diaphragm to the vent may be ensured. Further an increasing filling level of a fluid inside the vessel increases the closing force and the sealing effect of the diaphragm.

Preferably a part of the diaphragm, particularly the closing area of the diaphragm or even the whole diaphragm, arranged above the discharge channel, is positioned on a different level than the vent. In the designated use position the vent may be positioned below the diaphragm for injecting a fluid from below into a bowl via the valve. If so, the diaphragm, particularly the closing area of the diaphragm, may comprise a part reaching slightly into the discharge channel of the vent, particularly for providing a kind of a plug. Besides the part of the diaphragm reaching into the discharge channel it is preferred that the whole diaphragm is arranged on a different level, particularly above the vent. The arrangement of the vent and the diaphragm on different levels particularly without reaching into a level where the other part is positioned facilitates the distribution of the diaphragm and the vent over different parts. Particularly cavities, sharp edges or undercuts may be prevented.

Particularly the first part connected with the diaphragm and the second part connected with the vent are provided, wherein the first part is releasably connected with the second part, particularly by screwing or clamping, wherein the diaphragm covers the discharge opening for constituting an unidirectional valve. For instance the first part and the second part may comprise a screw thread or parts of a clip connection. In the designated use position when the first part is connected with the second part the diaphragm covers the vent for constituting the unidirectional valve. In released state the first part together with the diaphragm and/or the second part together with the vent can be easily cleaned separately. Particularly a cleaning of the contact surfaces between the diaphragm and the vent is enabled or at least facilitated.

Particularly the connecting area is radially spaced to the closing area, wherein the connecting area is connected with the closing area via bridges, wherein particularly each window is bordered by the closing area, the connecting area and two bridges. For instance the window may be designed as parts stamped out of the material of the diaphragm. Each window may be bordered by an outer rim defined by the material of the connecting area, an inner rim defined by the material of the closing area and two lateral rims defined by the material of the associated bridges. Particularly the radial outer rim of several, particularly all, windows, are arranged on the same radius so that the connecting area may have a mainly ring shaped forming. Particularly the radial inner rim of several, particularly all, windows, are arranged on the same radius so that the closing area may have a mainly circle shaped forming, wherein the radial inner rim of the windows is particularly arranged radial outwards with respect to the discharge opening of the vent and preferably radial outwards with respect to the material of the vent. Due to the design of the windows the flexibility of the diaphragm and/or a possible volume flow through the diaphragm may be adjusted.

An further aspect of the invention is directed to a bowl for receiving and/or mixing fluids, particularly a hair tinting means, comprising a vessel for receiving and/or mixing the fluids, the vessel comprising a rigid vessel body for bordering a use volume, and a stand adapted to be placed below the vessel for placing the vessel onto a ground, the stand comprising a vent for injecting a fluid from below, wherein the vessel comprises a flexible diaphragm for covering the vent, wherein the diaphragm and the vent constitute an unidirectional valve when the vessel is received by the stand in a designated use position.

Particularly the unidirectional valve is designed like the valve as previously described. Since the vent of the unidirectional valve is not a part of the vessel comprising the diaphragm of the unidirectional valve but part of the stand, the diaphragm may provide a flexible bottom of the vessel covering the other parts of the unidirectional valve. Cavities, sharp edges or undercuts at the vessel may be prevented so that areas which are difficult to clean may be omitted. Particularly the vessel body and the diaphragm may provide a mainly smooth bordering for the use volume. The diaphragm may be fixed to the vessel body in a manner that a mainly undercut-free, particularly stepless, surface bordering the use volume is provided by the vessel. Due to the smooth surface of the vessel the cleaning of the bowl is facilitated. It is used the insight that the elements for providing the unidirectional valve do not have to be fixed with others but may be distributed over different parts, namely the vessel on the one hand and the stand on the other hand, for constituting the unidirectional valve by connecting the vessel to the stand.

In the designate use position of the bowl, when the vessel is held by the stand and particularly connected to the stand, the diaphragm covers the vent. Particularly the diaphragm contacts the vent such that the diaphragm lay on the material of the vent forming a discharge opening. Since the diaphragm is flexible the risk is reduced that the vessel, particularly the bottom of the vessel, may be damaged by an impact of a tool used inside the vessel, particularly for mixing a fluid inside the use volume.

The use volume is a volume inside the vessel which can be filled with a fluid, when the bowl is placed onto a horizontal ground. The use volume is bordered at the bottom be means of the diaphragm and, if so, by a part of the vessel body. The use volume is bordered sideways mainly by the vessel body, particularly by the vessel body only. The use volume is accessible from above, particularly for inserting a tool, for instance a brush, for mixing a fluid inside the use volume and/or for collecting at least a part of the filled fluid for applying the fluid. Particularly a brush is used for mixing a filled mixture of a paste-like or liquid fluid and/or mixing two or more fluids for providing a hair tinting means of a particular color, wherein the mixed hair tinting means may be applied to human hair by means of the same brush. Preferably the same brush is used for cleaning the vessel and/or the stand after use.

An inlet of the valve located in the stand may be provided by the valve particularly on the opposite site to the tip area, wherein the inlet may point away from the use volume, particularly mainly downwards when the bowl is placed on a horizontal ground. The inlet of the valve and the discharge opening of the valve may be connected with each other by a discharge channel formed by the material of the vent. A pressurized fluid of an aerosol can and/or of a pump dispenser, particularly a hair tinting means, may be easily injected into the use volume of the vessel via the unidirectional valve constituted by the vent of the stand and the diaphragm of the vessel. The lowest part of the vent may be higher than a rest surface of the stand for contacting the ground when the bowl is placed onto a ground. The stand may surround and cover an upper part of the aerosol can and/or the pump dispenser so that leaking content, particularly aerosol, may be collected by the stand and may not soil other parts outside the bowl. Further the stand can be safely placed in a correct alignment onto an upper part of the aerosol can and/or the pump dispenser so that a valve of the aerosol can and/or the pump dispenser may not be damaged by the stand.

The vessel body is harder compared to the diaphragm. This means the vessel body is inflexible compared to the diaphragm. However, the vessel body may be made from a plastic material which allows a slight bending of the rigid vessel body. The wording "rigid" is understood such that in contrast to the flexible diaphragm a bending of the vessel body is not intended so that the vessel body is made from a different harder material than the material used for the diaphragm. Particularly the vessel body may comprise a measuring scale for measuring the volume of fluids filled in the vessel. This facilitates the receiving of an intended amount of the fluid and/or mixing of a mixture with predefined ratios of the used components.

Particularly the vessel body comprises a bottom opening closed by the diaphragm, wherein the diaphragm is fixed to the vessel body, particularly by 2-component injection or insertion molding. The bottom opening of the vessel body can be bordered by a circumferential ring area to with the diaphragm is fixed. Due to the two-component injection molding ("2K injection molding") and/or two-component insertion molding the vessel may be manufactured by one injection molding process using two different materials for the vessel body and the diaphragm. Two shots for injecting the different material can be performed in one injection molding process. Compared to overmolding the first injected polymer is still hot and has not shrunk yet, when the second polymer is injected. This reduces the risk of burrs being formed on the second polymer. This leads to a smooth surface of the vessel which can be easily cleaned. Further a short cycle time for manufacturing the vessel is gained and no manual insertion is required, so that the risk of damaging the first component is reduced.

Preferably the diaphragm is made from TPE, particularly TPS, TPO, TPV, rubber or silicone and/or the vessel body is made from a thermoplastic material, particularly SAN or PP. The thermoplastic Elastomer (TPE) provides a sufficient flexibility for the diaphragm and is suitable for 2K injection molding. Suitable TPE are styrenic block copolymers, polyolefin blends, elastomeric alloys (TPE-v or TPV), thermoplastic polyurethanes, thermoplastic copolyester or thermoplastic polyamides. Particularly suitable are thermoplastic Elastomer based on olefins (TPO), cross-linked and/or vulcanized thermoplastic Elastomer based on olefins (TPV) or styrol block copolymers (TPS), like SBS, SEBS, SEPS, SEEPS or MBS. Due to the thermoplastic material of the vessel body the vessel body may be harder than the diaphragm and is suitable for 2K injection molding. The vessel body may be particularly made from styrene-acrylonitrile resin (SAN) or polypropylene (PP), particularly clear and/or transparent PP.

Particularly preferred the vessel is releasably connectable with the stand, particularly by screwing or clamping. For instance the stand and the vessel body may comprise a screw thread or parts of a clip connection. In the designated use position when the vessel is connected with the stand the diaphragm covers the vent for constituting the unidirectional valve. In released state the vessel and/or the stand can be easily cleaned separately. Particularly a cleaning of the contact surfaces between the diaphragm and the vent is enabled or at least facilitated.

It is possible that the diaphragm comprises an inlet means, particularly an opening, wherein the diaphragm is adapted to close the inlet means by means of the flexible material of the diaphragm. The inlet means may be arranged in the closing area for closing the discharge opening. Du to the flexibility of the diaphragm the inlet means can be opened and closed by the material of the diaphragm. When the pressure of an injected fluid applies to the diaphragm the material of the diaphragm may bend away opening an inlet for injecting the fluid into the vessel. When no pressure applies to the diaphragm the material of the diaphragm may elastically bend back closing the inlet. In the alternate the closing and opening of the vent is performed by bending the diaphragm only. If a pressure inside the discharge channel of the vent is higher than the sum of a hydrostatic pressure onto the diaphragm and a spring force provided from the diaphragm towards the vent, the diaphragm may be lifted from the discharge opening so that the valve is opened. The fluid may leave the discharge opening and may pass the closing area of the diaphragm through windows in the diaphragm arranged radially outwards to the closing area. The diaphragm may comprise a sufficient flexibility for being lifted, for instance by connecting the closing area to the connecting area via bridges.

Preferably the diaphragm is adapted to increase a closing force for closing the discharge opening and/or the inlet means when the hydrostatic pressure above the inlet means increases. When a fluid is filled into the vessel the hydrostatic pressure of the fluid may increase the sealing effect of the diaphragm. The hydrostatic pressure may bend the diaphragm such that the discharge opening and/or the inlet means may be closed. For example the hydrostatic pressure of a filled fluid may press a part of the diaphragm slightly into the discharge channel of the vent so that the diaphragm may provide the function of a plug. The flexibility of the diaphragm may be chosen such that the diaphragm may be elastically deformed into the discharge channel by a suitable hydrostatic pressure. A leaking of the filled fluid via the diaphragm may be prevented.

Preferably the connecting area of the diaphragm comprises an extension protruding mainly upwards and/or mainly downwards, wherein the extension is fixed to the vessel body. Due to the extension of the connecting area particularly in vertical direction a surface for connecting the diaphragm with the vessel body is increased so that a good superficial bonding can be provided.

A further aspect of the invention is directed to an use of a bowl, which may be designed as previously described, for receiving and/or mixing fluids, particularly a hair tinting means. Since the vent of the unidirectional valve is not a part of the vessel comprising the diaphragm of the unidirectional valve but part of the stand, the vessel body and the diaphragm may provide a smooth surface of the vessel so that the cleaning of the bowl is facilitated when the bowl is used for receiving and/or mixing fluids.

A further aspect of the invention is directed to a method for receiving and/or mixing fluids, particularly a hair tinting means, comprising the steps of providing a bowl, which may be designed as previously described, wherein the vessel is connected with the stand, connecting the vent of the stand with a discharge stem of an aerosol can and/or pump dispenser, subsequently injecting a fluid of the aerosol can and/or a the pump dispenser into the vessel via the unidirectional valve of the bowl, subsequently mixing and/or applying the at least one fluid located inside the vessel, subsequently detaching the vessel from the stand and subsequently cleaning the vessel separated from the stand. Since the vent of the unidirectional valve is not a part of the vessel comprising the diaphragm of the unidirectional valve but part of the stand, the vessel body and the diaphragm may provide a smooth surface of the vessel so that the cleaning of the bowl is facilitated. Particularly a cleaning of the contact surfaces between the diaphragm and the vent is enabled or at least facilitated.

Particularly the vessel and the stand are cleaned at different times and/or different places. Since the bowl can be cleaned in a state when the vessel is separated from the stand each part can be cleaned independently from the other. Particularly a cleaning of surfaces between the vessel and the stand is enabled or at least facilitated.

Preferably the vessel and/or the stand are cleaned by brushing and/or rinsing. The rinsing may be performed by using water particularly in the case of water soluble fluids and/or by using a suitable solvent particularly in the case of lipophilic fluids. Since the vessel and/or the stand may provide mainly smooth surfaces without sharp edges or undercuts a facilitated cleaning by brushing and/or rinsing with water leads to good cleaning results. Particularly a brush is used which is also used for mixing and/or applying the fluids so that the brush itself can be cleaned at the same time.

Particularly the vessel is connected with the stand after cleaning the vessel and/or the stand. In cleaned state the vessel and the stand may be connected with each other so that the bowl is prepared for the next use. Particularly the vessel and the stand are connected with each others in dry state particularly when the vessel and the stand are dried after a cleaning by rinsing.

Figure 2:
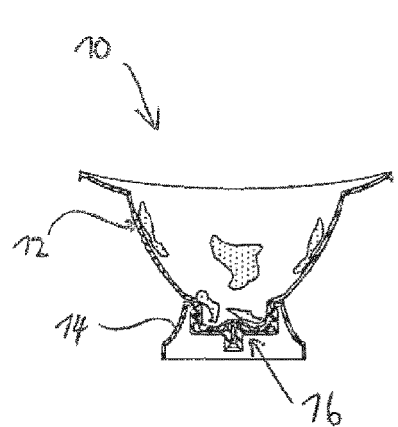
Figure 3:
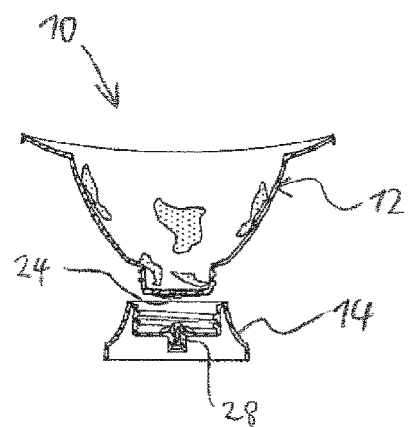
Figures 4, 5:
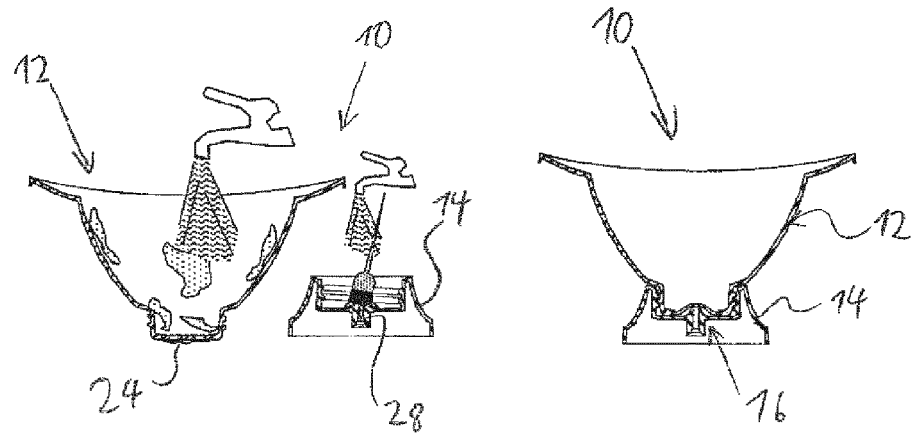
Figure 6:
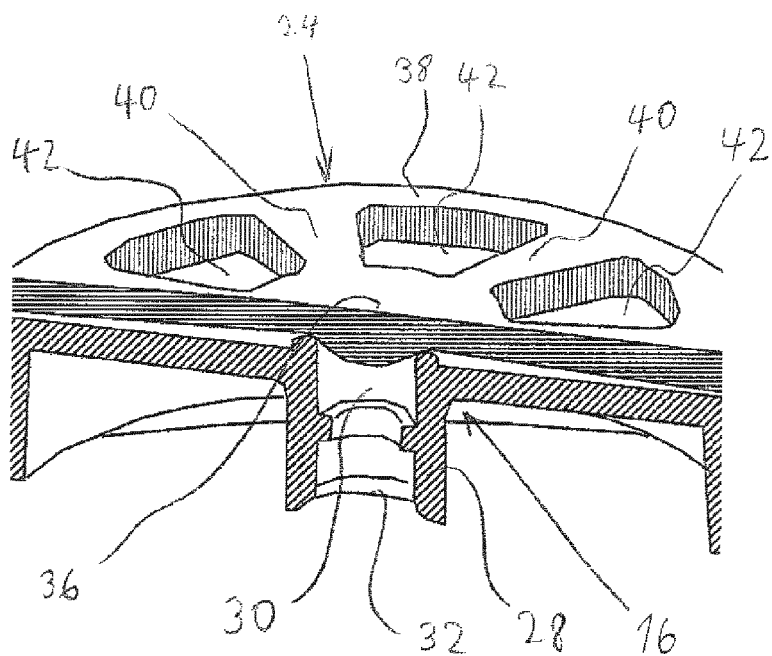

These and other aspects of the invention will be apparent from and elucidated with reference to the embodiments described hereinafter, wherein the described features can constitute each solely or in combination an independent aspect of the invention. In the drawings:

FIG. 1: a sectional side view of a bowl according to an aspect of the invention, FIG. 2: a sectional side view of the bowl of FIG. 2 after using products mixed, FIG. 3: a sectional side view of the bowl of FIG. 3 in detached state, FIG. 4: a sectional side view of the bowl of FIG. 4 during cleaning, FIG. 5: a sectional side view of the bowl of FIG. 5 after cleaning in connected state and FIG. 6: a sectional perspective side view of a detail of the valve used for the bowl of FIG. 2.

The bowl 10 illustrated in FIG. 1 comprises a vessel 12 for receiving and mixing fluids. The vessel 12 is releasably connected to a stand 14. The stand 14 is placed below the vessel 12 for placing the vessel 12 onto a ground 20. In the illustrated embodiment the vessel 10 consists of a rigid transparent vessel body 22 comprising a bottom opening 18 closed by a flexible diaphragm 24 bordering a use volume 26 inside the vessel 12. The stand 14 comprises a vent 28 covered by the diaphragm 24 of the vessel 12 in the illustrated designated use position constituting an unidirectional valve 16. Via the unidirectional valve 16 the content of an aerosol can and/or a pump dispenser may be filled into the use volume 26 for instance for mixing a hair tinting means. The vent 28 comprises a discharge channel 30 connecting an inlet 32 with a discharge opening 34 for injecting a fluid into the use volume 26 by lifting a closing area 36 of the diaphragm 24 from the discharge opening 34 by means of the pressure of the injected fluid. In the illustrated embodiment the vessel body 22 is screwed with the stand 14 until a point where the vessel body 22 abuts the stand 14 in the lowest position. In this position the diaphragm 24 is bend inwards towards the use volume 26 by the vent 28 so that the diaphragm 24 contacts the vent 28 with a defined minimum closing force.

When the bowl 10 is used for receiving and/or mixing a hair tinting means the bowl 10 may be soiled after use as illustrated in FIG. 2. For cleaning the bowl 10 the vessel 12 can be detached from the stand 14 by unscrewing the vessel 12 from the stand 14 as illustrated in FIG. 3. In the detached state the diaphragm 24 may elastically bend back to its original shape and/or the shape before assembling. Afterwards the vessel 12 and the stand 14 may be cleaned separately by brushing and rinsing as illustrated in FIG. 4. Particularly the diaphragm 24 and the vent 28 can be easily cleaned so that the functionality of the unidirectional valve 16 constituted by the vent 28 and the diaphragm 24 is not affected for next use. After the vessel 12 and/or the stand 14 are cleaned and, if so, dried the vessel 12 is screwed with the stand 14 so that the bowl is prepared for next use as illustrated in FIG. 5.

As illustrated in FIG. 6 the diaphragm 24 comprises a connecting area 38 by which the diaphragm 24 may be fixed to the vessel body 22 radially spaced to the vent 28. The connecting area 38 is connected to the closing area 36 by bridges 40 providing windows 42 in the diaphragm 24. Due to the bridges 40 the closing area 36 may be easily lifted from the discharge opening 34 when a sufficient pressure of an injected fluid applies in the discharge channel 30. In addition the closing area 36 may be pressed comparably to a plug slightly into the discharge channel 30 when a sufficient hydrostatic pressure is present inside the use volume 26. When the closing area 36 is lifted from the discharge opening 34 the injected fluid may enter the use volume 26 through the windows 42.

The invention claimed is:

1. Valve comprising
    a vent for injecting a fluid, wherein the vent comprises an inlet connected to a discharge opening via a discharge channel, and
    a flexible diaphragm for covering the discharge opening of the vent,
    wherein:
    (i) the diaphragm is separated from the vent,
    (ii) the diaphragm is adapted to be connected to a first part, which first part is a vessel body of a bowl,
    (iii) the vent is adapted to be connected to a second part, which second part is a stand of a bowl,
    (iv) the diaphragm comprises a closing area for closing the discharge opening and a connecting area configured for connecting the diaphragm with the first part,
    (v) the connecting area is radially spaced to the vent such that it does not come into contact with the vent when discharge opening is closed by the closing area, and
    (vi) at least one window is provided between the closing area and the connecting area, and
    (v) the connecting area is connected with the closing area via bridges, wherein each window is bordered by the closing area, the connecting area and two bridges,
    and wherein the valve is further configured such that
    (vii) when the discharge opening is closed by the closing area, the closing area is located on a plane higher than the bridge, and/or
    (viii) when the discharge opening is closed by the closing area, the bridge slopes downward radially from the closing area to the connecting area, and/or
    (ix) the connecting area has a thickness defined by a distance between a top and a bottom surface thereof, wherein said thickness is the same as that of the bridges or the window.

2. Valve according to claim 1, wherein the connecting area of the diaphragm is arranged at least partially on a level below the closing area in the designated use position for pressing the closing area onto the discharge opening of the vent.

3. Valve according to claim 1, wherein at least a part of the diaphragm arranged above the discharge channel, is positioned on a different level than the vent.

4. Valve according to claim 1, wherein the first part connected with the diaphragm and the second part connected with the vent are provided, wherein the first part is releasably connected with the second part, particularly by screwing or clamping, wherein the diaphragm covers the discharge opening for constituting an unidirectional valve.

5. The valve according to claim 1, wherein the connecting area surrounds the closing area.

6. Bowl for receiving and/or mixing fluids, comprising
    a vessel for receiving and/or mixing the fluids, the vessel comprising a rigid vessel body for bordering a use volume, and a stand adapted to be placed below the vessel for placing the vessel onto a ground, the stand comprising a vent for injecting a fluid from below, wherein the vessel comprises a flexible diaphragm for covering the vent, wherein the diaphragm and the vent constitute a unidirectional valve according to claim 1, when the vessel is received by the stand in a designated use position.

7. Bowl according to claim 6, wherein the vessel body comprises a bottom opening closed by the diaphragm, wherein the diaphragm is fixed to the vessel body, by 2-component injection or insertion molding.

8. Bowl according to claim 6, wherein the diaphragm is made from TPE, TPS, TPO, TPV, rubber or silicone and/or the vessel body is made from a thermoplastic material being SAN or PP.

9. Bowl according to claim 6, wherein the diaphragm is adapted to increase a closing force for closing the discharge opening when the hydrostatic pressure above the inlet means increases.

10. Bowl according to claim 6, wherein the connecting area of the diaphragm comprises an extension protruding mainly upwards and/or mainly downwards, wherein the extension is fixed to the vessel body.

11. Method for receiving and/or mixing fluids, comprising the steps of providing a bowl according to claim 6, wherein the vessel is connected with the stand, connecting the vent of the stand with a discharge stem of an aerosol can and/or a pump dispenser, subsequently injecting a fluid in the aerosol can and/or the pump dispenser into the vessel via the unidirectional valve of the bowl, subsequently mixing and/or applying the fluid located inside the vessel, subsequently detaching the vessel from the stand and subsequently cleaning the vessel separated from the stand.

12. Method according to claim 11, wherein the vessel and the stand are cleaned at different times and/or different places.

13. Method according to claim 11, wherein the vessel and/or the stand are cleaned by brushing and/or rinsing.

14. Method according to claim 13, wherein the vessel is connected with the stand after cleaning the vessel and/or the stand.

15. Valve comprising a vent for injecting a fluid, wherein the vent comprises an inlet connected to a discharge opening via a discharge channel, and a flexible diaphragm for covering the discharge opening of the vent, wherein:

(i) the diaphragm is separated from the vent, (ii) the diaphragm is adapted to be connected to a bowl vessel body, (iii) the vent is adapted to be connected to a bowl stand, (iv) the diaphragm comprises a closing area for closing the discharge opening and a connecting area configured for connecting the diaphragm with the bowl vessel body, (v) the connecting area is spaced to the vent, (vi) the connecting area surrounds the closing area, (vii) at least one window is provided between the closing area and the connecting area, and (viii) the connecting area is connected with the closing area via bridges, wherein each window is bordered by the closing area, the connecting area and two bridges, and wherein the valve is further configured such that (ix) when the discharge opening is closed by the closing area, the closing area is located on a plane higher than the bridge, and/or (x) when the discharge opening is closed by the closing area, the bridge slopes downward radially from the closing area to the connecting area, and/or (xi) the connecting area has a thickness defined by a distance between a top and a bottom surface thereof, wherein said thickness is the same as that of the bridges or the window.

\* \* \* \* \*